US011526254B2

(12) United States Patent
Hirose

(10) Patent No.: US 11,526,254 B2
(45) Date of Patent: Dec. 13, 2022

(54) INFORMATION PROCESSING APPARATUS, INFORMATION PROCESSING SYSTEM, AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventor: Yoichi Hirose, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 410 days.

(21) Appl. No.: 16/446,639

(22) Filed: Jun. 20, 2019

(65) Prior Publication Data

US 2020/0004391 A1    Jan. 2, 2020

(30) Foreign Application Priority Data

Jul. 2, 2018  (JP) .............................. JP2018-126364

(51) Int. Cl.
*G06F 3/0482* (2013.01)
*G06F 3/0483* (2013.01)
*G06F 3/14* (2006.01)

(52) U.S. Cl.
CPC .......... *G06F 3/0482* (2013.01); *G06F 3/0483* (2013.01); *G06F 3/14* (2013.01)

(58) Field of Classification Search
CPC . G06F 3/048; G06F 3/14; G06F 16/09; G05B 19/41
See application file for complete search history.

(56) References Cited

U.S. PATENT DOCUMENTS

| 7,636,500 | B1* | 12/2009 | Arant .................... G06Q 30/06 382/305 |
| 7,797,635 | B1* | 9/2010 | Denise .................. G06F 16/951 707/711 |
| 8,020,105 | B1* | 9/2011 | Lemay ............. H04M 1/72436 715/746 |
| 9,299,030 | B1* | 3/2016 | Hotchkies ............. G06N 5/046 |

(Continued)

FOREIGN PATENT DOCUMENTS

| JP | 2011138271 | 7/2011 |
| JP | 2013137626 | 7/2013 |

OTHER PUBLICATIONS

"Office Action of Japan Counterpart Application" with English translation thereof, dated Apr. 26, 2022, p. 1-p. 8.

*Primary Examiner* — Beau D Spratt
*Assistant Examiner* — Qi Wan
(74) *Attorney, Agent, or Firm* — JCIPRNET

(57) ABSTRACT

An information processing apparatus includes a display unit and a control unit, the display unit performs list display of plural pieces of information by dividing the plural pieces of information into plural pages in a case where the pieces of information corresponding to a number, which is equal to or larger than a predetermined limit, exist in a folder within a server that stores the plural pieces of information, and the control unit performs display control of performing the list display on the display unit by adding designated information to information in a predetermined location, in a case where the designated information does not exist in a selected page.

8 Claims, 9 Drawing Sheets

(56) References Cited

U.S. PATENT DOCUMENTS

| | | | |
|---|---|---|---|
| 2011/0197121 A1* | 8/2011 | Kletter | G06F 40/166 |
| | | | 715/234 |
| 2012/0317468 A1* | 12/2012 | Duquene | G06F 40/134 |
| | | | 715/207 |
| 2014/0365867 A1 | 12/2014 | Kawasaki et al. | |
| 2017/0108851 A1* | 4/2017 | Krokiewicz | G05B 19/4184 |

* cited by examiner

FIG. 3

| INFORMATION MANAGEMENT SYSTEM | | | |
|---|---|---|---|
| FILE (F)  EDIT (E)  DISPLAY (Y)  FAVORITES (A)  TOOL (T)  HELP (H) | | | |
| SERVICE TREE                ✕ | NAME | TYPE | UPDATE DATE |
| ⊞ ☐ xxx PROCESS CHART | ☐ xxx1 DATA | DOCUMENT | 01/23/2016 |
| ⊞ ☐ xxx MANAGEMENT CHART | ☐ xxx2 DATA | DOCUMENT | 02/24/2017 |
| ⊟ ☐ DOCUMENT MANAGEMENT | ☐ xxx3 DATA | DOCUMENT | 05/08/2018 |
| ⊞ ☐ ORIGINAL | ☐ xxx4 DATA | DOCUMENT | 12/14/2017 |
| ☐ APPROVED | ☐ xxx5 DATA | DOCUMENT | 09/14/2017 |
| ⊞ ☐ xxxxx CHART | ☐ xxx6 DATA | DOCUMENT | 06/14/2016 |
| ⊞ ☐ xxxxx CHART | ☐ xyz DATA | DOCUMENT | 04/04/2015 |

FIG. 4

|  |  |  |  |  | ◁ 1 2 3 4 5 ▷ |
|---|---|---|---|---|---|
| NO. | NAME | TYPE | UPDATE DATE | UPDATER | SIZE |
| ☐ 1 | ☐ xxx1 DATA | DOCUMENT | 01/23/2016 | YAMADA TARO | 512MB |
| ☐ 2 | ☐ xxx2 DATA | DOCUMENT | 02/24/2017 | SATOU HANAKO | 100KB |
| ☐ 3 | ☐ xxx3 DATA | DOCUMENT | 05/08/2018 | SATOU HANAKO | 21MB |
| ☐ 4 | ☐ xxx4 DATA | DOCUMENT | 12/14/2017 | OKADA JIRO | 999KB |
| ☐ 5 | ☐ xxx5 DATA | DOCUMENT | 09/14/2017 | USIYAMA SABURO | 128MB |
| ☐ 6 | ☐ xxx6 DATA | DOCUMENT | 06/14/2016 | TANAKA SIROU | 1GB |
| ☐ 7 | ☐ xyz DATA | DOCUMENT | 04/04/2015 | TANAKA SIROU | 65KB |

FIG. 8

| | NO. | NAME | TYPE | UPDATE DATE | UPDATER | SIZE |
|---|---|---|---|---|---|---|
| ☐ | 1 | ☐ xxx1 DATA | DOCUMENT | 01/23/2016 | YAMADA TARO | 512MB |
| ☐ | 2 | ☐ xxx2 DATA | DOCUMENT | 02/24/2017 | SATOU HANAKO | 100KB |
| ☐ | 3 | ☐ xxx3 DATA | DOCUMENT | 05/08/2018 | SATOU HANAKO | 21MB |
| ☐ | 4 | ☐ xxx4 DATA | DOCUMENT | 12/14/2017 | OKADA JIRO | 999KB |
| ☐ | 5 | ☐ xxx5 DATA | DOCUMENT | 09/14/2017 | USIYAMA SABURO | 128MB |
| ☐ | 6 | ☐ xxx6 DATA | DOCUMENT | 06/14/2016 | TANAKA SIROU | 1GB |
| ☐ | 7 | ☐ xyz DATA | DOCUMENT | 04/04/2015 | TANAKA SIROU | 65KB |

| | NO. | NAME | TYPE | UPDATE DATE | UPDATER | SIZE |
|---|---|---|---|---|---|---|
| ☐ | 36 | ☐ 123 DATA | DOCUMENT | 01/23/2016 | SATOU HANAKO | 128MB |
| ☐ | 37 | ☐ 111 DATA | DOCUMENT | 02/24/2017 | SATOU HANAKO | 120KB |
| ☐ | 38 | ☐ 123 DATA | DOCUMENT | 05/08/2018 | YAMADA TARO | 256MB |
| ☐ | 39 | ☐ 111 DATA | DOCUMENT | 12/14/2017 | OKADA JIRO | 2GB |
| ☐ | 40 | ☐ 123 DATA | DOCUMENT | 09/14/2017 | TANAKA SIROU | 64MB |
| ☐ | 41 | ☐ 111 DATA | DOCUMENT | 06/14/2016 | USIYAMA SABURO | 10MB |
| ☐ | 4 | ☐ xxx4 DATA | DOCUMENT | 12/14/2017 | OKADA JIRO | 999KB |

FIG. 9

| | NO. | NAME | TYPE | UPDATE DATE | UPDATER | SIZE |
|---|---|---|---|---|---|---|
| | | | | | ◁ 1 2 3 4 5 ▷ | |
| ☐ | 1 | ☐ xxx1 DATA | DOCUMENT | 01/23/2016 | YAMADA TARO | 512MB |
| ☐ | 2 | ☐ xxx2 DATA | DOCUMENT | 02/24/2017 | SATOU HANAKO | 100KB |
| ☐ | 3 | ☐ xxx3 DATA | DOCUMENT | 05/08/2018 | SATOU HANAKO | 21MB |
| ☐ | 4 | ☐ xxx4 DATA | DOCUMENT | 12/14/2017 | OKADA JIRO | 999KB |
| ☐ | 5 | ☐ xxx5 DATA | DOCUMENT | 09/14/2017 | USIYAMA SABURO | 128MB |
| ☐ | 6 | ☐ xxx6 DATA | DOCUMENT | 06/14/2016 | TANAKA SIROU | 1GB |
| ☐ | 7 | ☐ xyz DATA | DOCUMENT | 04/04/2015 | TANAKA SIROU | 65KB |

| | NO. | NAME | TYPE | UPDATE DATE | UPDATER | SIZE |
|---|---|---|---|---|---|---|
| | | | | | ◁ 1 2 3 4 5 ▷ | |
| ☐ | 4 | ☐ xxx4 DATA | DOCUMENT | 12/14/2017 | OKADA JIRO | 999KB |
| ☐ | 36 | ☐ 123 DATA | DOCUMENT | 01/23/2016 | SATOU HANAKO | 128MB |
| ☐ | 37 | ☐ 111 DATA | DOCUMENT | 02/24/2017 | SATOU HANAKO | 120KB |
| ☐ | 38 | ☐ 123 DATA | DOCUMENT | 05/08/2018 | YAMADA TARO | 256MB |
| ☐ | 39 | ☐ 111 DATA | DOCUMENT | 12/14/2017 | OKADA JIRO | 2GB |
| ☐ | 40 | ☐ 123 DATA | DOCUMENT | 09/14/2017 | TANAKA SIROU | 64MB |
| ☐ | 41 | ☐ 111 DATA | DOCUMENT | 06/14/2016 | USIYAMA SABURO | 10MB |

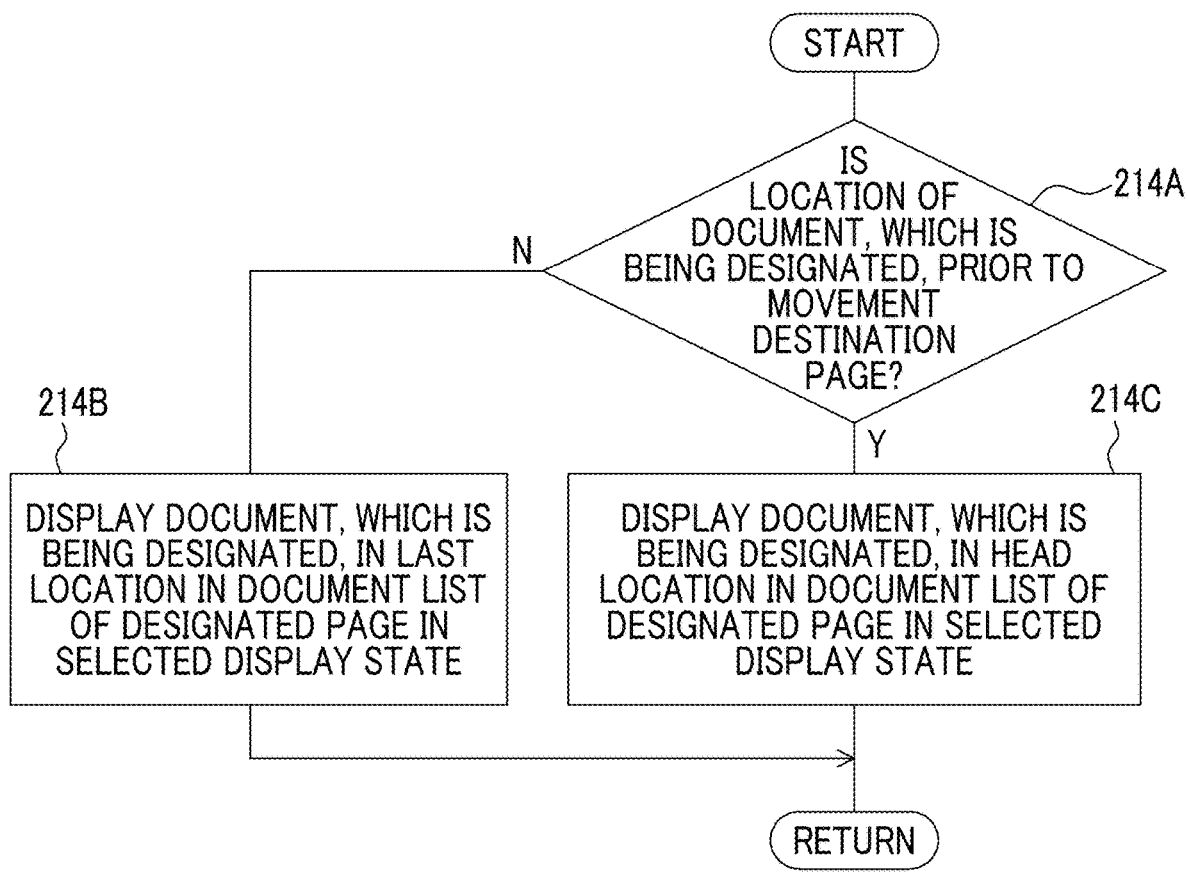

INFORMATION PROCESSING APPARATUS, INFORMATION PROCESSING SYSTEM, AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2018-126364 filed Jul. 2, 2018.

BACKGROUND

(i) Technical Field

The present invention relates to an information processing apparatus, an information processing system, and a non-transitory computer readable medium storing an information processing program.

(ii) Related Art

JP2013-137626A proposes an information processing apparatus which displays a plurality of pages acquired through division performed on a plurality of elements included in a list. Specifically, JP2013-137626A proposes to determine a plurality of element groups based on division conditions according to attributes of the elements included in the list, and to allocate each of the element groups to any one page of the plurality of pages such that all the elements included in the determined element group are displayed on the same page.

SUMMARY

Due to a limit of the number of displays, in a case where the number that is displayable is displayed for each page and designated information does not exist in a selected page, it is not possible to perform list display in a state in which the information is designated. Aspects of non-limiting embodiments of the present disclosure relate to an information processing apparatus, an information processing system, and a non-transitory computer readable medium storing an information processing program, which are capable of performing the list display in the state in which information is designated in a case where the list display of a plurality of pieces of information is performed for each page.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a display unit that performs list display of a plurality of pieces of information by dividing the plurality of pieces of information into a plurality of pages in a case where the pieces of information corresponding to a number, which is equal to or larger than a predetermined limit, exist in a folder within a server that stores the plurality of pieces of information; and a control unit that performs display control of performing the list display on the display unit by adding designated information to information in a predetermined location, in a case where the designated information does not exist in a selected page.

BRIEF DESCRIPTION OF THE DRAWINGS

Exemplary embodiment(s) of the present invention will be described in detail based on the following figures, wherein:

FIG. 3 is a diagram illustrating an example in which tree display is performed and pieces of information are displayed in a designated folder in a case where a document stored in the information processing apparatus is read;

FIG. 4 is a diagram illustrating an example in which a list of documents is displayed through page division;

FIG. 8 is a diagram illustrating an example in which, in a case where the page movement to a fifth page is performed in a state in which a document corresponding to "No. 4" of a first page is being designated, the document corresponding to "No. 4" is displayed at a last of a list of documents of the fifth page on a display in a selected display state;

FIG. 9 is a diagram illustrating an example in which the document that is being designated is displayed in a first location of the fifth page in a case where the page movement to the fifth page is performed even though the location of the document that is being designated is the first page; and FIG. 10 is a flowchart illustrating a processing example in a case where a location, in which the document that is being designated is displayed in the selected display state according to an original location of the document that is being designated, is changed.

DETAILED DESCRIPTION

Figure 1:
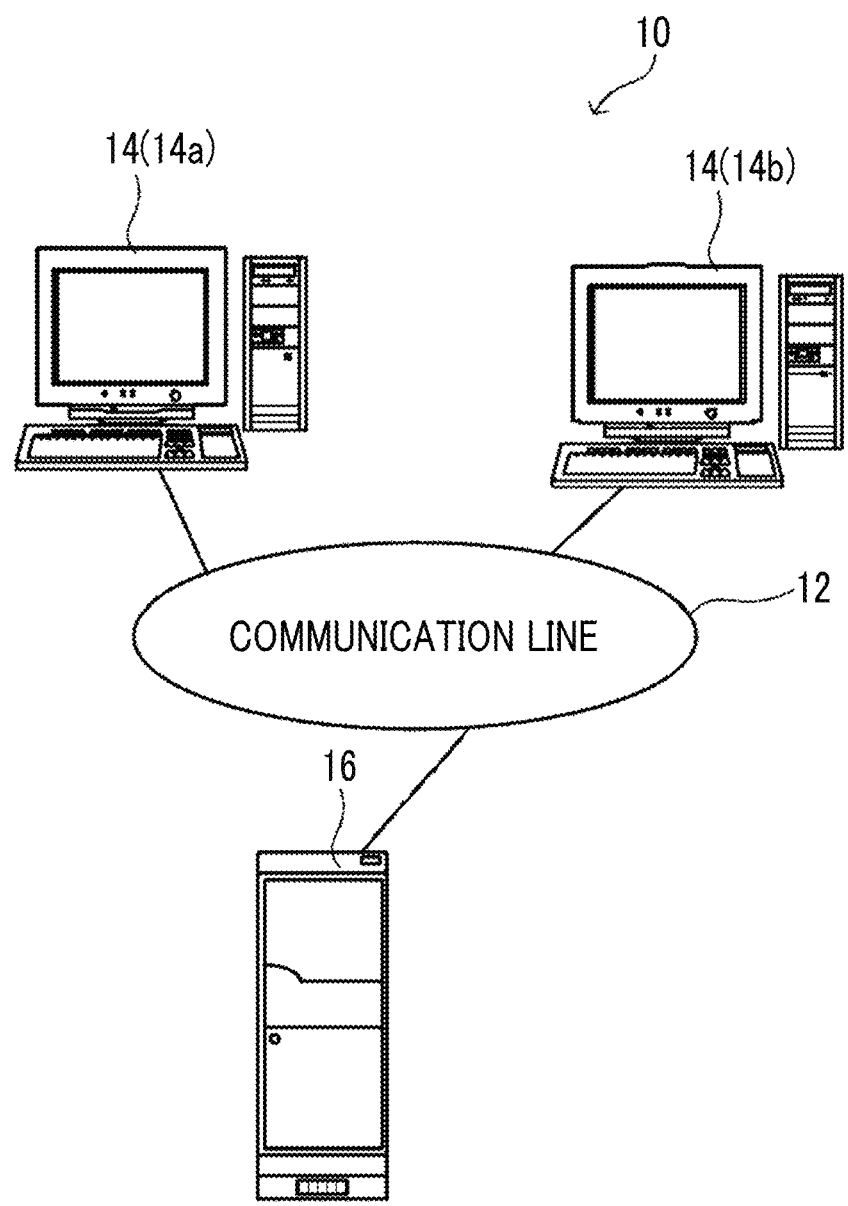
FIG. 1 is a diagram illustrating a schematic configuration of an information processing system according to an exemplary embodiment.

Hereinafter, an example of an exemplary embodiment will be described with reference to the accompanying drawings. In the exemplary embodiment, an information processing system, in which a plurality of information processing apparatuses and servers are respectively connected through communication lines, such as various networks, will be described as an example. FIG. 1 is a diagram illustrating a schematic configuration of an information processing system 10 according to the exemplary embodiment.

As illustrated in FIG. 1, the information processing system 10 according to the exemplary embodiment includes a plurality of information processing apparatuses 14a, 14b, . . . and a cloud server 16. Meanwhile, in a case where it is not necessary to perform description through division performed on the information processing apparatuses 14a, 14b, . . . , it is possible to perform description by omitting alphabets of tails of symbols. In addition, although an example, in which the plurality of information processing apparatuses 14a, 14b, . . . are included, is described in the exemplary embodiment, the number of information processing apparatuses 14 may be one.

The information processing apparatus 14 and the cloud server 16 are connected to each other through a communication line 12, such as a Local Area Network (LAN), a Wide Area Network (WAN), the Internet, or the Intranet, respectively. Furthermore, the information processing apparatus 14 and the cloud server 16 are capable of transmitting and receiving various data to each other through the communication line 12, respectively.

In the information processing system 10 according to the exemplary embodiment, the cloud server 16 provides a document management service, in which a document is managed, as a cloud service. For example, in the document management service, it is possible to store various documents as information in the cloud server 16 or to read a management target document stored in the cloud server 16 by accessing the cloud server 16 from the information processing apparatus 14.

Figure 2:
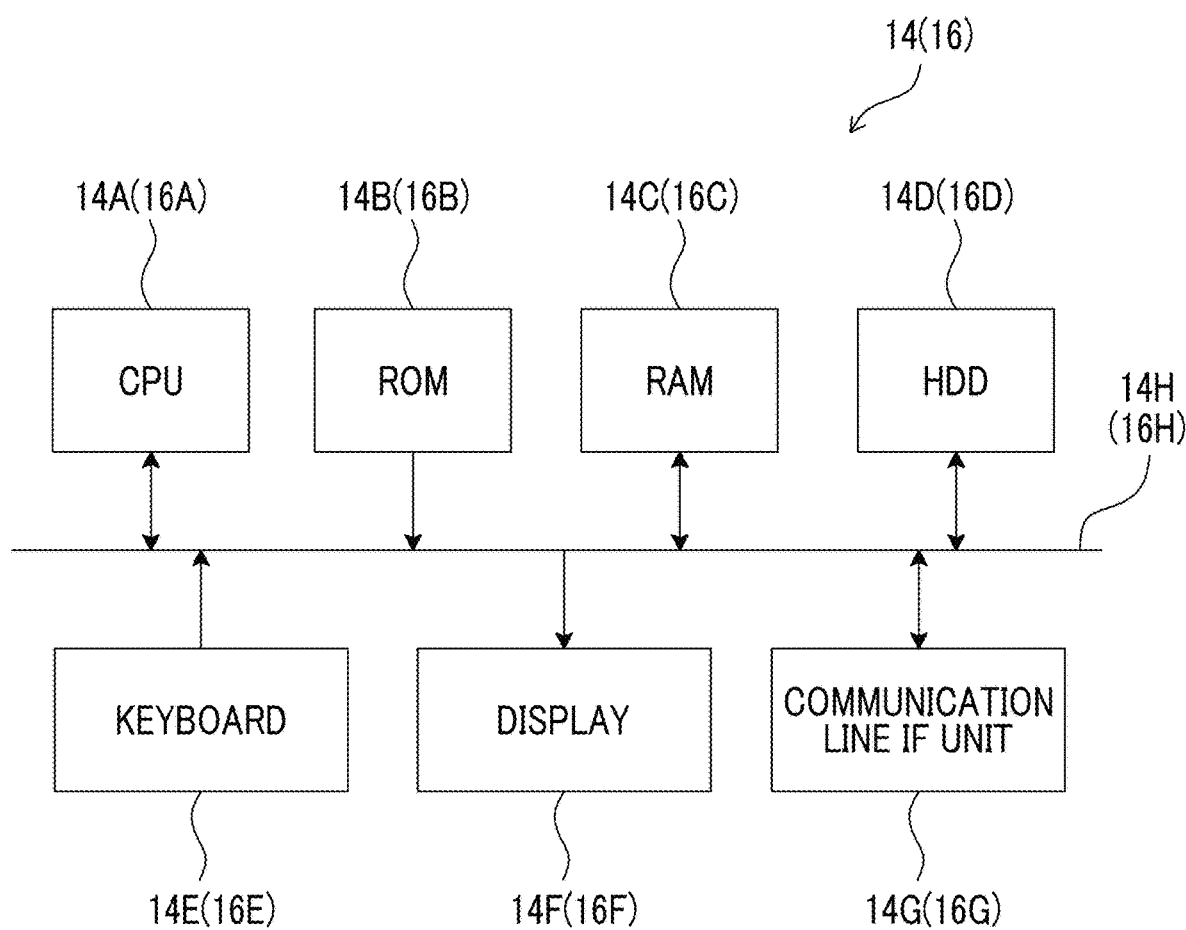
FIG. 2 is a block diagram illustrating a configuration of principal parts of electric systems of an information processing apparatus and a cloud server in the information processing system according to the exemplary embodiment.

Subsequently, a configuration of principal parts of electric systems of the information processing apparatus 14 and the cloud server 16 according to the exemplary embodiment will be described. FIG. 2 is a block diagram illustrating the configuration of the principal parts of the electric systems of the information processing apparatus 14 and the cloud server 16 in the information processing system 10 according to the exemplary embodiment. Meanwhile, since the information processing apparatus 14 and the cloud server 16 basically have a configuration of a general computer, the information processing apparatus 14 will be described as a representative.

As illustrated in FIG. 2, the information processing apparatus 14 according to the exemplary embodiment includes a CPU 14A as a control unit, a ROM 14B, a RAM 14C, an HDD 14D, a keyboard 14E, a display 14F as a display unit, and a communication line interface (IF) unit 14G. The CPU 14A instructs all the operations of the information processing apparatus 14. Various control programs, various parameters, and the like are previously stored in the ROM 14B. The RAM 14C is used as a work area or the like in a case where the various programs are executed by the CPU 14A. Various data, application programs, and the like are stored in the HDD 14D. The keyboard 14E is used to input various pieces of information. The display 14F is used to display the various pieces of information. The communication line IF unit 14G is connected to the communication line 12, and transmits and receives the various data to and from another device which is connected to the communication line 12. The above-described units of the information processing apparatus 14 are electrically connected to each other through a system bus 14H, respectively. Meanwhile, in the information processing apparatus 14 according to the exemplary embodiment, the HDD 14D is applied as a storage unit. However, the exemplary embodiment is not limited thereto, and another non-volatile storage unit, such as a flash memory, may be applied.

With the above configuration, the information processing apparatus 14 according to the exemplary embodiment performs access to the ROM 14B, the RAM 14C, and the HDD 14D, acquisition of the various data through the keyboard 14E, and display of the various pieces of information with respect to the display 14F using the CPU 14A, respectively. In addition, the information processing apparatus 14 controls transmission and reception of the communication data through the communication line IF unit 14G using the CPU 14A.

As described above, in the information processing system 10 according to the exemplary embodiment, the cloud server 16 provides the document management service, in which the document is managed, as the cloud service. For example, it is possible to read the management target document by accessing the cloud server 16 from the information processing apparatus 14. In the exemplary embodiment, an example, in which the cloud server 16 is accessed from the information processing apparatus 14 using a web browser and a document stored in the cloud server 16 is read, will be described as an example. In addition, in the exemplary embodiment, in a case where the document stored in the cloud server 16 is designated, it is possible to directly designate the target document using a Uniform Resource Locator (URL) without sequentially tracing the folder up to the target document. For example, in a case where identification information (ID) of the document is "abcdefg" and a display page is designated to a fifth page, the URL is designated as "http://servername.domainname.com/web/documentInList?id=abcdefg&page=5". Note that information of the management target includes images or thumbnails of the images.

Here, in a case where, instead of the cloud server 16, a document which is stored in the information processing apparatus 14 is read, there is a method for performing tree display and displaying pieces of information in a designated folder, as illustrated in FIG. 3. In this case, in a case where a large number of pieces of information exist in the folder, generally, it is possible to read target information through scroll display. However, in a case where a large volume of documents exist in a folder to which the document belongs in the cloud service as in the exemplary embodiment, it is difficult to display a list of large volume of documents and there is an upper limit to the number of documents which can be displayed at once. Here, in a case of the cloud service, in order to increase speedup and browsability, there is a case where display is performed through page division for every predetermined number, as illustrated in FIG. 4, without performing list display of a large number of documents corresponding to the upper limit. In addition, in a case where there is a limit to the number in which the documents are acquired from an inside of the folder, there is a case where all the documents are not acquired and the target document does not exist in the acquired list of documents. In this case, it is necessary to acquire a list of documents, which is not acquired, again. In this case, it is difficult to display the list of documents, that is, to display the list of documents in a state in which a designated target document is selected.

Here, in the exemplary embodiment, in a case where the number of pieces of information, which is larger than a predetermined limit, exists in the folder of the cloud server 16, the list display of the plurality of pieces of information is performed by dividing the plurality of pieces of information into a plurality of pages. Furthermore, in a case where designated information does not exist in the selected page, display control is performed such that the list display is performed by adding the designated information to a predetermined location.

Specifically, in a case where the list display of the documents, which are stored in the cloud server 16 from the information processing apparatus 14, is performed, it is assumed that there is a limit on the number of documents which can be acquired from the cloud server at once. For example, it is assumed that there is a limit that the number of documents, which can be acquired from the cloud server 16 at once, is a predetermined number (for example, 50). In this case, documents which exceed the limit are displayed by acquiring a list of documents by dividing the documents in the folder into plural numbers. In a case where it is assumed that 1000 documents are stored in the cloud server 16 and there is a limit that the number of documents, which can be acquired from the cloud server 16 at once, is 50 as an example, the information processing apparatus 14 displays the list of documents by acquiring the list of documents to be acquired 20 separate times. Furthermore, in a case where the designated document does not exist in the list of documents, which is acquired for the first time, the information processing apparatus 14 excludes a specific document in the predetermined location from the list of documents, which is acquired for the first time, and adds the designated document. Therefore, the list of documents is displayed, that is, the list of documents is displayed in a state in which the designated target document is selected. Meanwhile, here, the list of documents indicates a list of documents corresponding to the number of documents, which can be acquired in the limit among all the lists of documents in the folder.

Figure 5:
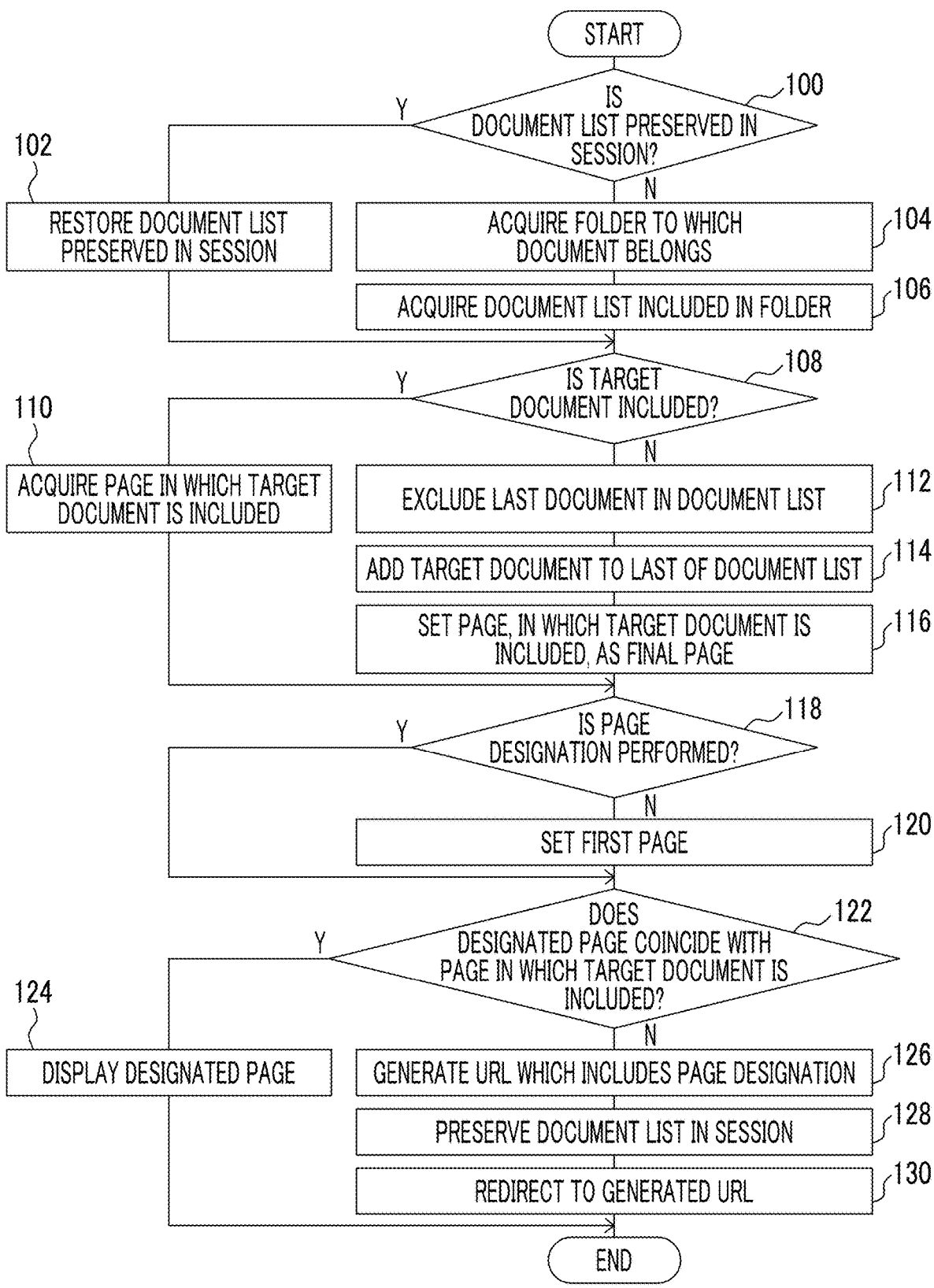
FIG. 5 is a flowchart illustrating an example of a processing flow in a case where information stored in the cloud server is read in the information processing apparatus of the information processing system according to the exemplary embodiment.

Subsequently, a detailed process in a case where the information stored in the cloud server 16 is read in the information processing apparatus 14 of the information processing system 10, which is configured as described above, will be described. FIG. 5 is a flowchart illustrating an example of a processing flow in the case where the information stored in the cloud server 16 is read in the information processing apparatus 14 of the information processing system 10 according to the exemplary embodiment. Meanwhile, a process in FIG. 5 starts, for example, in a case where an instruction is provided to access the cloud server 16 from the information processing apparatus 14 and to read the target document. In the exemplary embodiment, the process in FIG. 5 starts, for example, in a case where the target document stored in the cloud server 16 is designated using the URL.

In step 100, the CPU 14A determines whether or not a list of documents is preserved in a session. The determination is performed to access the cloud server 16, which provides the document management service, and to determine whether or not a target list of documents is preserved in the session is determined. That is, the process below is already performed and it is determined whether or not the list of documents is preserved. In a case where the determination is positive, the process proceeds to step 102. In a case where the determination is negative, the process proceeds to step 104.

In step 102, the CPU 14A restores the list of documents which is preserved in the session, and the process proceeds to step 108.

In contrast, in step 104, the CPU 14A acquires a folder, to which the document belongs, from the cloud server 16, and the process proceeds to step 106.

In step 106, the CPU 14A acquires the list of documents in the folder from the cloud server 16, and the process proceeds to step 108. At this time, in a case where the number of documents in the folder exceeds a preset upper limit value, only documents (list of documents) corresponding to the upper limit value can be acquired. Meanwhile, step 106 corresponds to an acquisition unit.

In step 108, the CPU 14A determines whether or not the target document is included in the acquired or restored list of documents. In a case where the determination is positive, the process proceeds to step 110. In a case where the determination is negative, the process proceeds to step 112.

In step 110, the CPU 14A acquires a page in which the target document is included, and the process proceeds to step 118. That is, the CPU 14A checks a location, in which the target document in the list of documents exists, and checks a page to be displayed on the display.

In step 112, the CPU 14A excludes the last document in the list of documents, and the process proceeds to step 114.

In step 114, the CPU 14A adds the target document to the last of the list of documents, and the process proceeds to step 116.

In step 116, the CPU 14A sets the page, in which the target document is included, to a final page, and the process proceeds to step 118.

In step 118, the CPU 14A determines whether or not the page designation is performed. The determination is performed to determine whether or not the page designation exists in the URL which is instructed for screen display. In a case where the determination is positive, the process proceeds to step 122. In a case where the determination is negative, the process proceeds to step 120.

In step 120, the CPU 14A sets a first page as a designation page, and the process proceeds to step 122.

In step 122, the CPU 14A determines whether or not the designation page coincides with the page in which the target document is included. In a case where the determination is positive, the process proceeds to step 124. In a case where the determination is negative, the process proceeds to step 126.

In step 124, the CPU 14A displays the designation page on the display 14F, and ends a series of processes.

In contrast, in step 126, the CPU 14A generates the URL which includes the designation page, and the process proceeds to step 128.

In step 128, the CPU 14A preserves the list in the session, and the process proceeds to step 130.

In step 130, the CPU 14A redirects the URL, which is generated in the step 126, and ends the series of processes. That is, in a case where the CPU 14A redirects the URL, the processes from step 100 are performed again. For example, in a case where designation of the page of the target document does not exist in the URL or in a case where the page of the target document is changed even though the designation of the page exists, the target document is added to the last of the list of documents. Therefore, in a case where the URL which designates the final page in the list of documents is generated and the list of documents is preserved in the session, the processes from step 100 are performed again, with the result that the list of documents of the final page of the list of documents is displayed, and thus the target document is displayed in a state in which the target document is selected. Accordingly, in a case where the list of documents of the designation page is displayed on the display 14F in step 124, the designated target document is displayed in the state in which the designated target document is selected.

In a case where a list is displayed in a document management system, for example, a case where sorting is performed in ascending order based on file names is general. In a case where the sorting is performed in ascending order based on the file names, a fact that a target document is not included in an upper limit of the list of documents indicates that a name of the document appears after the last document of the acquired list of documents in a sort order. Accordingly, as a means of naturalness of the display, it is desired to change the last document as in step 114 of FIG. 5. That is, the process in FIG. 5 may be a process in a case where the pieces of information stored in the cloud server 16 are sorted in ascending order based on the file names.

In contrast, in a case where the document is displayed at the last of the list of documents, page movement is necessarily performed to the last page of the acquired list of documents, and redirection occurs as in step 130 as a structure of a web system. In a case where priority is given to a case where the redirection is not performed to the utmost, the target document may be normally added at the head.

Figure 6:
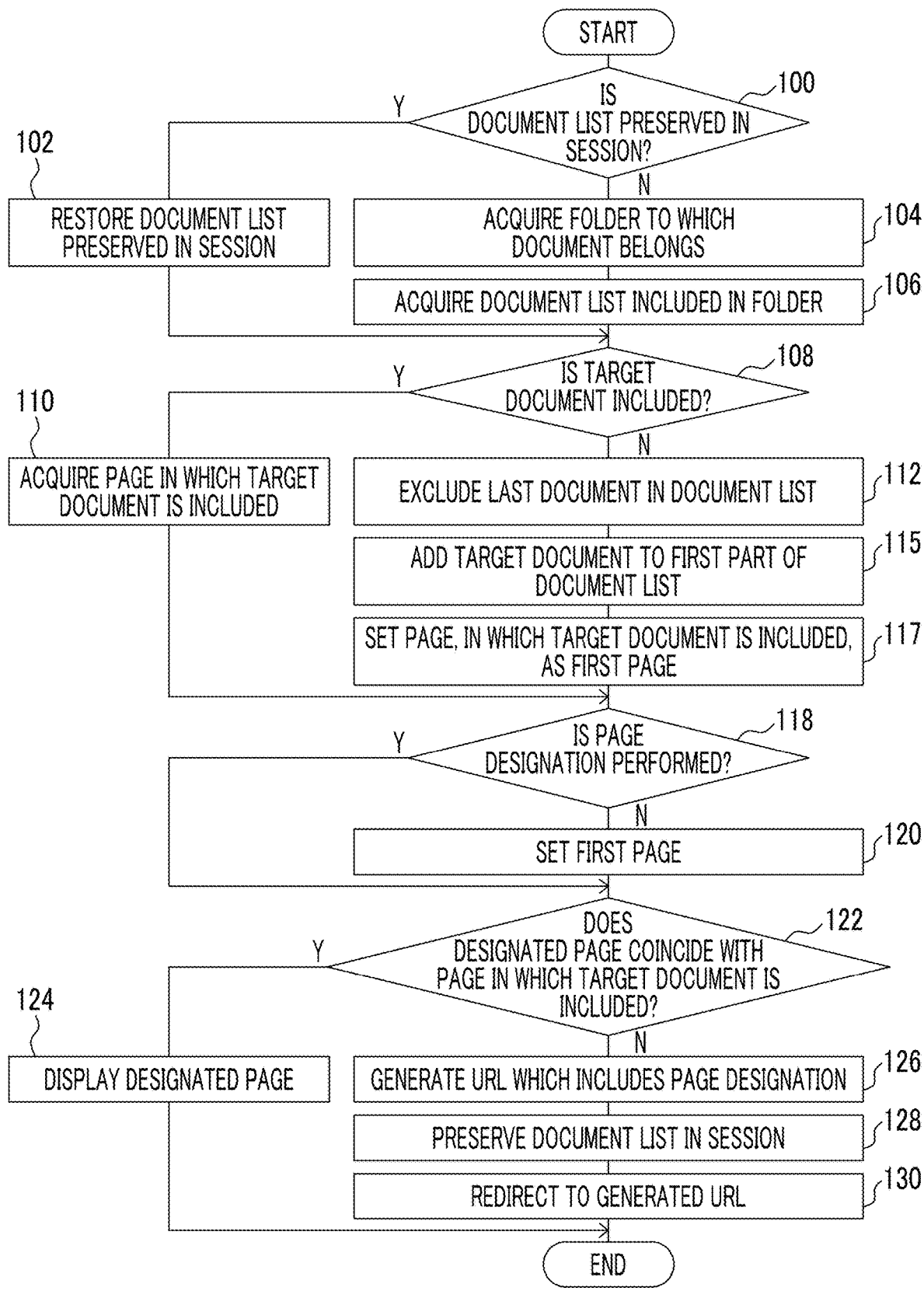
FIG. 6 is a flowchart illustrating a modification example of the processing flow in the case where the information stored in the cloud server is read in the information processing apparatus of the information processing system according to the exemplary embodiment.

Here, as a modification example of a processing flow in a case where the information stored in the cloud server 16 is read, a processing example in a case where the documents stored in the cloud server 16 are not sorted in ascending order based on the file names or a case where the priority is given to the case where redirection is not performed will be described. FIG. 6 is a flowchart illustrating the modification example of the processing flow in the case where the information stored in the cloud server 16 is read in the information processing apparatus 14 of the information processing system 10 according to the exemplary embodiment. Meanwhile, description will be performed while attaching the same reference symbols to the same processes as in FIG. 5.

In step 100, the CPU 14A determines whether or not a list of documents is preserved in a session. The determination is performed to access the cloud server 16, which provides the document management service, and to determine whether or not a target list of documents is preserved in the session is determined. That is, the process below is already performed and it is determined whether or not the list of documents is preserved. In a case where the determination is positive, the process proceeds to step 102. In a case where the determination is negative, the process proceeds to step 104.

In step 102, the CPU 14A restores the list of documents which is preserved in the session, and the process proceeds to step 108.

In contrast, in step 104, the CPU 14A acquires a folder, to which the document belongs, from the cloud server 16, and the process proceeds to step 106.

In step 106, the CPU 14A acquires the list of documents in the folder from the cloud server 16, and the process proceeds to step 108. At this time, in a case where the number of documents in the folder exceeds a preset upper limit value, only documents (list of documents) corresponding to the upper limit value can be acquired. Meanwhile, step 106 corresponds to an acquisition unit.

In step 108, the CPU 14A determines whether or not the target document is included in the acquired or restored list of documents. In a case where the determination is positive, the process proceeds to step 110. In a case where the determination is negative, the process proceeds to step 112.

In step 110, the CPU 14A acquires a page in which the target document is included, and the process proceeds to step 118. That is, the CPU 14A checks a location, in which the target document in the list of documents exists, and checks a page to be displayed on the display.

In step 112, the CPU 14A excludes the last document in the list of documents, and the process proceeds to step 115.

In step 115, the CPU 14A adds the target document to a first part of the list, and the process proceeds to step 117.

In step 117, the CPU 14A sets the page, in which the target document is included, to a first page, and the process proceeds to step 118.

In step 118, the CPU 14A determines whether or not the page designation is performed. The determination is performed to determine whether or not the page designation exists in the URL which is instructed for screen display. In a case where the determination is positive, the process proceeds to step 122. In a case where the determination is negative, the process proceeds to step 120.

In step 120, the CPU 14A sets the first page as the designation page, and the process proceeds to step 122.

In step 122, the CPU 14A determines whether or not the designation page coincides with the page in which the target document is included. In a case where the determination is positive, the process proceeds to step 124. In a case where the determination is negative, the process proceeds to step 126.

In step 124, the CPU 14A displays the designation page on the display 14F, and ends a series of processes.

In contrast, in step 126, the CPU 14A generates the URL which includes the designation page, and the process proceeds to step 128.

In step 128, the CPU 14A preserves the list in the session, and the process proceeds to step 130.

In step 130, the CPU 14A redirects the URL, which is generated in the step 126, and ends the series of processes. That is, in a case where the CPU 14A redirects the URL, the processes from step 100 are performed again. For example, in the case where designation of the page of the target document does not exist in the URL or in the case where the page of the target document is changed even though the designation of the page exists, the target document is added to the last of the list of documents. Therefore, in the case where the URL which designates the final page in the list of documents is generated and the list of documents is preserved in the session, the processes from step 100 are performed again, with the result that the list of documents of the final page of the list of documents is displayed, and thus the target document is displayed in the state in which the target document is selected. Accordingly, in the case where the list of documents of the designation page is displayed on the display 14F in step 124, the designated target document is displayed in the state in which the designated target document is selected.

Figure 7:
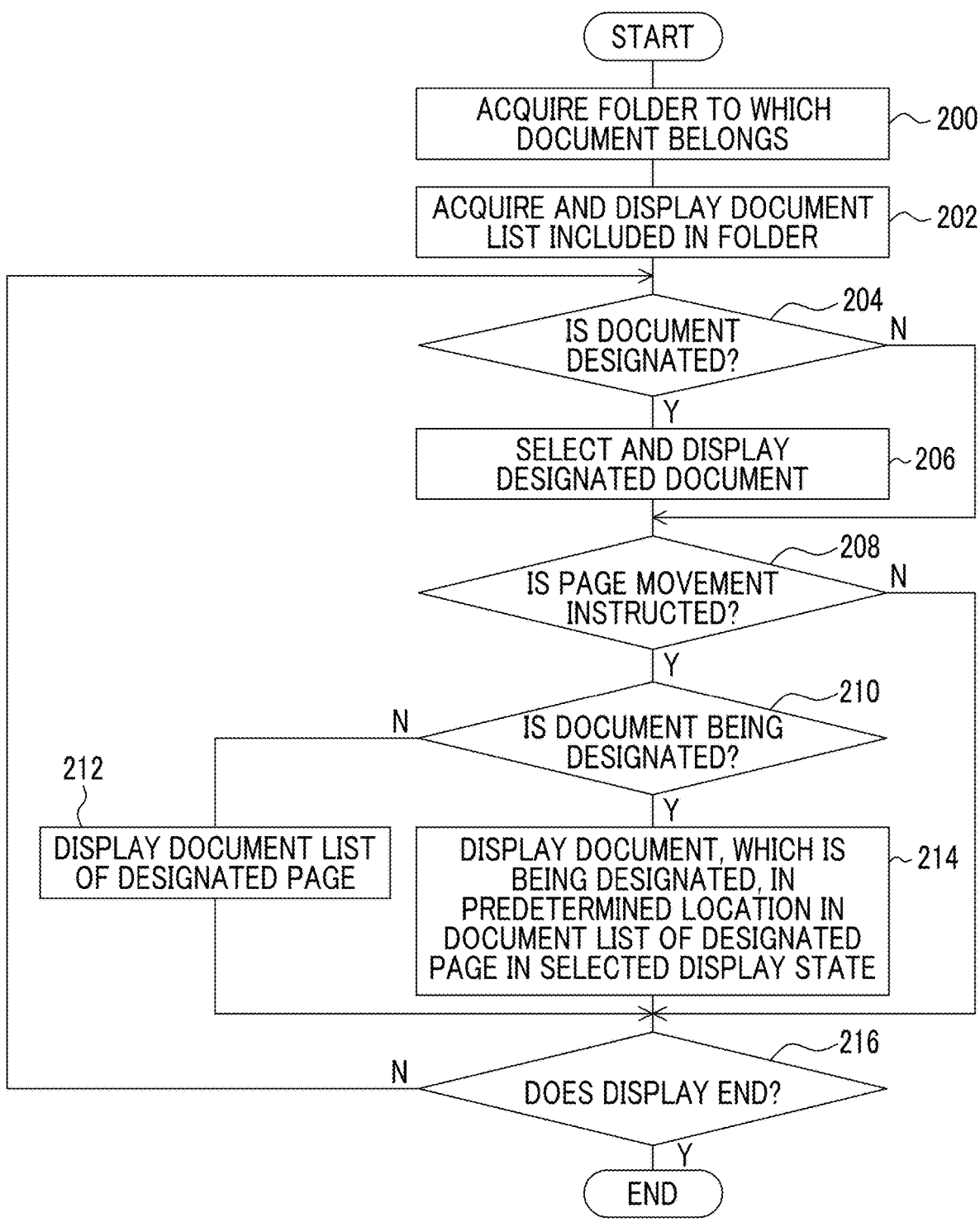
FIG. 7 is a flowchart illustrating an example of a processing flow in a case where, after the list of documents of the information stored in the cloud server is acquired, page movement is performed in the acquired list of documents, in the information processing apparatus of the information processing system according to the exemplary embodiment.

Subsequently, a processing example, in a case where, after the list of documents is acquired from the cloud server 16, the page movement is performed in the acquired list of documents will be described. FIG. 7 is a flowchart illustrating an example of a processing flow in the case where, after the list of documents of information stored in the cloud server 16 is acquired, the page movement is performed in the acquired list of documents, in the information processing apparatus 14 of the information processing system 10 according to the exemplary embodiment.

In step 200, the CPU 14A acquires a folder, to which the documents belong, and the process proceeds to step 202.

In step 202, the CPU 14A acquires a list of documents in the folder, displays the list of documents on the display 14F, and the process proceeds to step 204. At this time, in a case where the number of documents in the folder exceeds a preset upper limit, only documents corresponding to a value of the upper limit can be acquired.

In step 204, the CPU 14A determines whether or not the document is designated. The determination is performed to determine whether or not, for example, the keyboard 14E or the like is operated and the document is designated. In a case where the determination is positive, the process proceeds to step 206. In a case where the determination is negative, the process proceeds to step 208.

In step 206, the CPU 14A selects and displays the designated document, and the process proceeds to step 208. The selection and display are performed to display, which indicates that the document is selected, by, for example, changing a color of the selected document or performing reversal display or the like.

In step 208, the CPU 14A determines whether or not the page movement is instructed. The determination is performed to determine whether or not an operation which indicates that the page movement is performed or a page of the movement destination is designated. In a case where the determination is positive, the process proceeds to step 210. In a case where the determination is negative, the process proceeds to step 216.

In step 210, the CPU 14A determines whether or not the document is being designated. The determination is performed to determine whether or not the document is selectively displayed through step 206. In a case where the determination is negative, the process proceeds to step 212. In a case where the determination is positive, the process proceeds to step 214.

In step 212, the CPU 14A displays the list of documents of the designated page on the display 14F, and the process proceeds to step 216. That is, the CPU 14A displays the list of documents corresponding to the designated page from the list of documents.

In step 214, the CPU 14A displays the document that is being designated in a predetermined location of the list of documents of the designated page on the display 14F in a selected display state, and the process proceeds to step 216. For example, as illustrated in FIG. 8, in a case where page movement to a fifth page is performed in a state in which a document corresponding to "No. 4" of a first page is being designated, the document corresponding to "No. 4" is displayed, as the predetermined location, at the last of the list of documents of the fifth page on the display 14F in the selected display state. Otherwise, the document corresponding to "No. 4" may be displayed in a first location instead of the last location in the selected display state.

In step 216, the CPU 14A determines whether or not the display ends. The determination is performed to determine, for example, whether or not an operation of moving to another website, an operation of closing the browser, or the like is performed. In a case where the determination is negative, the process returns to step 204, and the above-described processes are repeated. In a case where the determination is positive, the series of processes end.

In a case where the processes are performed as above, the list of the page corresponding to a movement destination is displayed while displaying the document in the selected state even though the page is moved in the list of documents acquired from the cloud server 16.

Meanwhile, in step 214, the location, in which the document that is being designated is displayed in the selected display state, may be changed according to an original location of the document that is being designated. For example, as illustrated in FIG. 9, in a case where the page movement to the fifth page is performed even though the location of the document that is being designated is the first page, the document that is being designated exists in a location prior to the fifth page, and thus the document that is being designated is displayed in the first location of the fifth page. In contrast, in a case where the location of the document that is being designated is a second page and movement is performed to the first page, the document that is being designated exists in a location after the first page, and thus the document is displayed in a last location of the first page. Therefore, after the page movement, the location of the document that is being designated with respect to the page acquired after movement is understood. In this case, processes illustrated in FIG. 10 are performed as the process in step 214. FIG. 10 is a flowchart illustrating a processing example in a case where the location, in which the document that is being designated is displayed in the selected display state according to the original location of the document that is being designated, is changed.

That is, in step 214A, the CPU 14A determines whether or not the original location of the document that is being designated is prior to the page of the movement destination. In a case where the determination is negative, the process proceeds to step 214B. In a case where the determination is positive, the process proceeds to step 214C.

In step 214B, the CPU 14A displays the document that is being designated in the last location of the list of documents of the designated page on the display 14F in the selected display state, and the process proceeds to step 216.

In contrast, in step 214C, the CPU 14A displays the document that is being designated in a head location of the list of documents of the designated page on the display 14F in the selected display state, and the process proceeds to step 216.

Meanwhile, in the exemplary embodiment, an example, in which the document stored in the cloud server 16 is read through the browser, is described. However, the exemplary embodiment is not limited thereto, and may be applied to, for example, a form in which the document stored in the cloud server 16 is read through an application.

In addition, the process performed in the information processing apparatus 14 according to the exemplary embodiment may be a process performed by software, a process performed by hardware, or a process performed by combining both the software with the hardware. In addition, each process may be stored and distributed in a storage medium as a program.

In addition, the exemplary embodiment of the present invention is not limited to above, and it is apparent that, other than above, various modifications are possible in a scope without deviating from the gist of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a display unit that performs list display of a plurality of pieces of information by dividing the plurality of pieces of information into a plurality of webpages in a case where the pieces of information corresponding to a number, which is equal to or larger than a predetermined limit, exist in a folder within a server that stores the plurality of pieces of information;

a control unit that performs display control of performing the list display on the display unit by adding designated information to information in a predetermined location, in a case where the designated information does not exist in a selected webpage from the plurality of webpages; and an acquisition unit acquires a list of the pieces of information from the folder which includes target information designated using a uniform resource locator (URL) used to designate the pieces of information in the folder, wherein, in a case where an original location of the designated information is located in a webpage prior to the selected webpage, the control unit performs display by adding the designated information to a head location of the selected webpage, and wherein, in a case where the original location of the designated information is located in a webpage after the selected webpage, the control unit performs display by adding the designated information to a last location of the selected webpage.

2. The information processing apparatus according to claim 1, wherein, in a case where the pieces of information are sorted in ascending order based on information names, the display control is performed such that the list display is performed by adding the designated information to the last location of the selected webpage.

3. The information processing apparatus according to claim 2, wherein the acquisition unit acquires a list of the pieces of information corresponding to a number, which corresponds to the predetermined limit, from the list of the pieces of information in the folder in a case where the pieces of information corresponding to the number, which is equal to or larger than the limit, exist in the folder, wherein the display unit performs the list display of the plurality of pieces of information by dividing the list of the pieces of information, which is acquired by the acquisition unit, into the plurality of webpages, and wherein the control unit performs the display control of performing the list display on the display unit by adding the designated information to the predetermined location, in a case where the designated information does not exist in the list of the pieces of information which is acquired as the selected webpage by the acquisition unit.

4. The information processing apparatus according to claim 1, wherein, in a case where the pieces of information are not sorted in ascending order based on information names or a priority is given to a case where redirection is not performed, the display control is performed such that the list display is performed by adding the designated information to the head location of the selected webpage.

5. The information processing apparatus according to claim 4, wherein the acquisition unit acquires a list of the pieces of information corresponding to a number, which corresponds to the predetermined limit, from the list of the pieces of information in the folder in a case where the pieces of information corresponding to the number, which is equal to or larger than the limit, exist in the folder, wherein the display unit performs the list display of the plurality of pieces of information by dividing the list of the pieces of information, which is acquired by the acquisition unit, into the plurality of webpages, and wherein the control unit performs the display control of performing the list display on the display unit by adding the designated information to the predetermined location, in a case where the designated information does not exist in the list of the pieces of information which is acquired as the selected webpage by the acquisition unit.

6. The information processing apparatus according to claim 1, wherein the acquisition unit acquires a list of the pieces of information corresponding to a number, which corresponds to the predetermined limit, from the list of the pieces of information in the folder in a case where the pieces of information corresponding to the number, which is equal to or larger than the limit, exist in the folder, wherein the display unit performs the list display of the plurality of pieces of information by dividing the list of the pieces of information, which is acquired by the acquisition unit, into the plurality of webpages, and wherein the control unit performs the display control of performing the list display on the display unit by adding the designated information to the predetermined location, in a case where the designated information does not exist in the list of the pieces of information which is acquired as the selected webpage by the acquisition unit.

7. An information processing system comprising:

the information processing apparatus according to claim 1; and a server that includes the folder which is capable of storing the pieces of information corresponding to the number which is equal to or larger than the limit.

8. A non-transitory computer readable medium storing an information processing program causing a computer to function at least as a display unit that performs list display of a plurality of pieces of information by dividing the plurality of pieces of information into a plurality of webpages in a case where the pieces of information corresponding to a number, which is equal to or larger than a predetermined limit, exist in a folder within a server that stores the plurality of pieces of information;

a control unit that performs display control of performing the list display on the display unit by adding designated information to information in a predetermined location, in a case where the designated information does not exist in a selected webpage from the plurality of webpages; and an acquisition unit acquires a list of the pieces of information from the folder which includes target information designated using a uniform resource locator (URL) used to designate the pieces of information in the folder, wherein, in a case where an original location of the designated information is located in a webpage prior to the selected webpage, the control unit performs display by adding the designated information to a head location of the selected webpage, and wherein, in a case where the original location of the designated information is located in a webpage after the selected webpage, the control unit performs display by adding the designated information to a last location of the selected webpage.

* * * * *